Dec. 28, 1948.  L. R. CASLER ET AL  2,457,347
ELECTRICAL OUTLET STRUCTURE
Filed Dec. 26, 1947
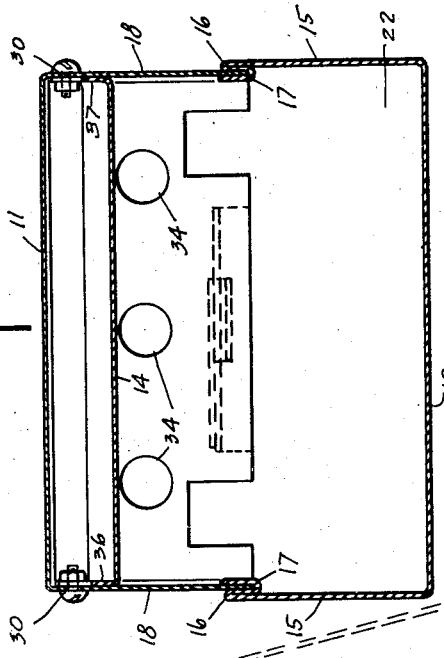
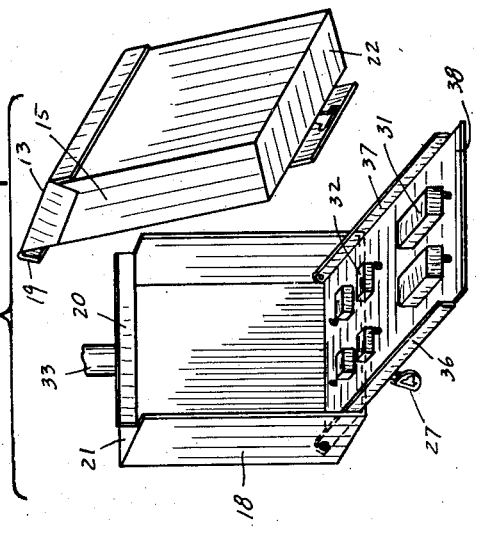
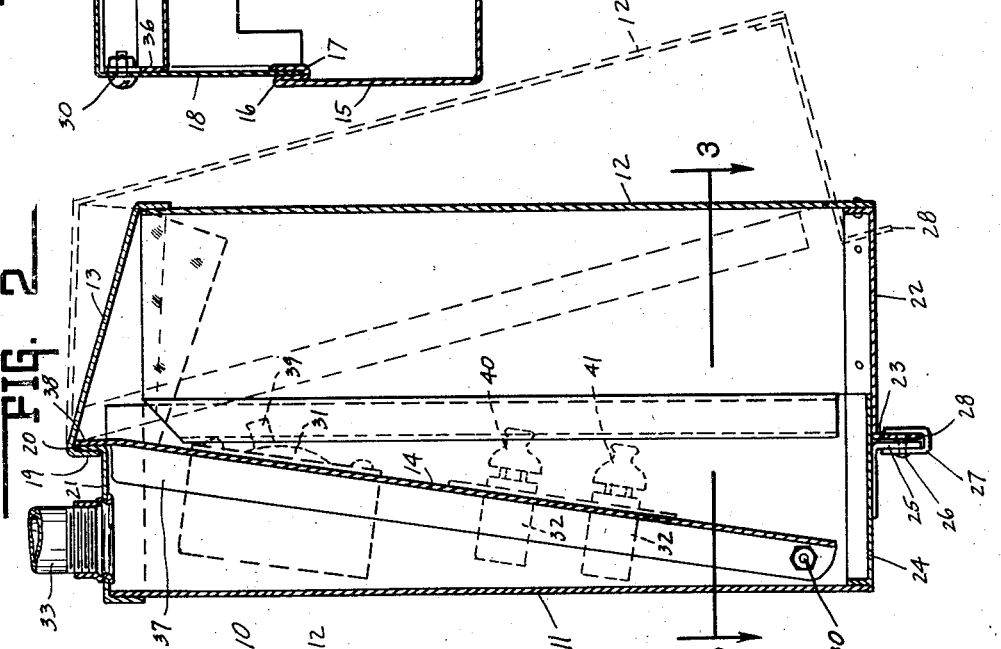
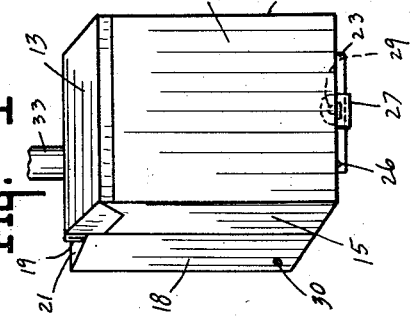
INVENTORS.
LESLIE R. CASLER.
L. FRED MILNER.
BY
Lockwood, Goldsmith & Galt.
ATTORNEYS.

Patented Dec. 28, 1948

2,457,347

UNITED STATES PATENT OFFICE 2,457,347

ELECTRICAL OUTLET STRUCTURE

Leslie R. Casler and Leslie Fred Milner,
Indianapolis, Ind.

Application December 26, 1947, Serial No. 793,942

4 Claims. (Cl. 174—52)

This invention relates to a protective type outlet structure commonly known as a service box, for use primarily in trailer camps and the like.

Many States and counties have, within the past few years, enacted legislation establishing certain standards for electrical equipment and the installation thereof. With the growth of trailer camps and similar populated areas, such legislation has become necessary because of the shock and fire hazards attendant upon the use of the conventional service boxes with their exposed points and wiring.

It is the primary object of this invention to provide an electrical outlet structure or circuit service box which will comply with electrical equipment codes and which will reduce to a minimum any shock and fire hazards.

It is a further object of this invention to provide a structure which affords ready access to the electrical units or fixtures mounted therein and to their wiring and parts.

It is a still further object of this invention to provide a structure which is compact, relatively small in size, and which is weatherproof.

The main features of the present invention reside in the construction of the box and its complementary cover and in a pivotally mounted panel upon which the outlet units are mounted, and which is adjustable so that ready access to the wiring and parts of the units may be had.

The full nature of the invention will be understood from the accompanying drawings and the following description and claims:

Fig. 1 is a perspective view of the invention.

Fig. 2 is a vertical section view thereof with its cover being shown partly elevated in dotted lines.

Fig. 3 is a horizontal section view thereof taken on line 3—3 of Fig. 2.

Fig. 4 is a perspective view thereof with the cover removed and panel lowered.

In the drawings 10 shows the outlet structure or service box which includes an open face box 11 and a cover 12 therefor. The box 11 has a downwardly inclined top portion 13 for draining off water and for retarding any outward and downward movement of the dead front panel 14 as hereinafter more fully described.

The free ends of the side walls 15 of the cover 12 are formed into return loop portions 16 thereby providing a groove or channel 17 into which the ends of the side walls 18 of the box 11 are adapted to be fitted in a friction grip.

The free end of the top portion 13 has a depending tongue 19 which is parallel with the upwardly flared tongue 20 of the top portion 21 of the box 11 when the service box is assembled as in Fig. 2.

The free end of the bottom portion 22 of cover 12 terminates in a depending tongue 23. Secured to the under surface of bottom portion 24 of box 11 is the tongue 25. Each of said tongues, 23 and 25, is apertured and the apertures are in alignment. Pivoted at 26 to depending tongue 25 is the latch 27, the free end of which is bifurcated at 28 and has an aperture 29 formed therein which is also in alignment with the apertures of the tongues 23 and 25. When the service box 10 is in assembled relation, as in Fig. 2, a padlock or other suitable lock can be placed through said apertures, thereby locking the box and cover.

Pivotally mounted at 30 adjacent the lower extremities of the side walls 18 is the dead front panel 14. Mounted on the panel are a plurality of electrical units or fixtures, herein shown as on and off switches 31 and sockets 32. Circuit wires (not shown) are introduced into the box through the conduit 33 and are secured to the switches 31 and sockets 32. Said circuit wires can be led out from the box through the apertures 34 formed in the bottom portion 24 of box 11.

The panel 14 has abbreviated side walls or webs 36 and 37 which engage the inner surfaces of side walls 18 in a friction fit when the panel 14 is in closed position. The panel 14 when in such closed position is biased as shown in Fig. 2 and its upper extremity 38 is slightly angled so that it is parallel to the tongue 20.

When the cover 12 is mounted on the box 11 it is supported thereon at the upper ends of both the tongue 20 and the upper extremity 38 of the panel 14. In order to gain access to the switches 31 and sockets 32, it is necessary first to disengage the latch 27. Then the lower portion of the cover is swung outwardly and upwardly as shown by the dotted lines in Fig. 2 thereby exposing the front face of the panel 14 and enabling a person to operate the toggle handles 39 of the switches 31 or to engage or disengage the attachment plugs 40 and 41 from their respective sockets.

It is to be observed that access to the face of the panel 14 is readily afforded for the purposes mentioned above, without the necessity of completely removing the cover 12. Thus, the cover affords protection to the panel in rainy weather while access is being had to the electrical fixtures mounted thereon.

It has been pointed out that the panel 14 is friction fitted within the box 11. In order to lower it, it is necessary only to exert a small amount of outward and downward pressure upon the extremity 38. The question immediately arises whether a pull upon attachement plugs 40 and 41 to disengage them, would not also cause the panel to swing open. But this does not happen, since the inclined top portion 13 acts as a guard or stop shoulder to prevent such an opening of the panel. This is true because of the radius of the swing of the panel. It is not until the cover 12 is completely removed from box 11, or at least swung outwardly and upwardly a further distance than is necessary to provide access to the face of the panel, that the panel can be swung outwardly and downwardly.

When, however, it becomes necessary to repair the parts or wiring connected to the electrical units or fixtures 31 and 32, then the cover can be removed completely, as shown in Fig. 4, and the panel swung downwardly so that access may be had to the rear face of the panel and to the parts and wiring.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A protective type outlet structure including an open face box into which circuit wires are introduced, a panel member pivoted near its lower end to the box near the lower end thereof and normally biased for tilting downwardly and outwardly to expose the rear face of the panel for circuit wire connection purposes, and a cover for said box pivotally supported therein at the upper ends of both and tiltable outwardly and upwardly to expose said panel, the latter being retained within the box by said cover when in box closing position.

2. A protective type outlet structure including an open face box into which circuit wires are introduced, a panel member pivoted near its lower end to the box near the lower end thereof and normally biased for tilting downwardly and outwardly to expose the rear face of the panel for circuit wire connection purposes, and a cover for said box pivotally supported thereon at the upper ends of both, said cover having an inclined top portion terminating in a depending member and being tiltable outwardly and upwardly to expose said panel, the latter being retained within the box by said inclined top portion when the box and cover are in closed position.

3. A protective type outlet structure including an open face box into which circuit wires are introduced, a panel member pivoted near its lower end to the box near the lower end thereof and normally biased for tilting downwardly and outwardly to expose the rear face of the panel for circuit wire connection purposes, and a cover for said box pivotally and releasably supported on the upper ends of both the box and the panel, said cover having an inclined top portion terminating in a depending tongue and being tiltable outwardly and upwardly to expose said panel, the latter being retained within the box by said inclined top portion until the cover is tilted outwardly and upwardly at an angle greater than 30 degrees.

4. An outlet structure as defined by claim 1 wherein the adjacent side edges of the box and cover have complementary, substantially coextensive confronting cooperating tongue and channel formations.

LESLIE R. CASLER.
L. FRED MILNER.

REFERENCES CITED

The following references are of record in the file of this patent:

UNITED STATES PATENTS

| Number | Name | Date |
| --- | --- | --- |
| 547,078 | Johnson | Oct. 1, 1895 |
| 1,302,137 | Cook | Apr. 29, 1919 |
| 2,185,562 | Nielsen | Jan. 2, 1940 |